United States Patent
Nasir et al.

(10) Patent No.: US 11,959,401 B1
(45) Date of Patent: Apr. 16, 2024

(54) DESWIRL SYSTEM FOR GAS TURBINE ENGINE

(71) Applicant: HONEYWELL INTERNATIONAL INC., Charlotte, NC (US)

(72) Inventors: Shakeel Nasir, Phoenix, AZ (US); Atul Verma, Phoenix, AZ (US); Jeffrey Krise, Phoenix, AZ (US); Doni Tapederi, Phoenix, AZ (US); Jacob Salai, Phoenix, AZ (US); Rodolphe Dudebout, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/189,739

(22) Filed: Mar. 24, 2023

(51) Int. Cl.
*F01D 9/04* (2006.01)
*F02C 3/04* (2006.01)
*F23R 3/26* (2006.01)

(52) U.S. Cl.
CPC .................. *F01D 9/04* (2013.01); *F02C 3/04* (2013.01); *F23R 3/26* (2013.01); *F05D 2220/323* (2013.01); *F05D 2240/127* (2013.01); *F05D 2260/60* (2013.01)

(58) Field of Classification Search
CPC ...... F01D 9/04; F02C 3/04; F23R 3/26; F05D 2220/323; F05D 2240/127; F05D 2260/60
See application file for complete search history.

(56) References Cited

U.S. PATENT DOCUMENTS

| | | | |
|---|---|---|---|
| 7,966,821 B2 | 6/2011 | Zupanc et al. | |
| 8,429,916 B2 | 4/2013 | Rudrapatna et al. | |
| 9,404,422 B2 | 8/2016 | Zupanc et al. | |
| 9,726,032 B2 | 8/2017 | Ress, Jr. et al. | |
| 11,060,405 B2 | 7/2021 | Ziecina et al. | |
| 11,162,383 B2 | 11/2021 | Kington et al. | |
| 11,261,789 B2 | 3/2022 | Menheere et al. | |
| 11,371,434 B2 | 6/2022 | Pearon et al. | |
| 11,421,595 B2 | 8/2022 | Nasir et al. | |
| 2007/0245710 A1 | 10/2007 | Schumacher et al. | |
| 2012/0272663 A1 | 11/2012 | Moussa et al. | |
| 2018/0274376 A1* | 9/2018 | King | B22F 5/10 |
| 2021/0172455 A1 | 6/2021 | Kisun et al. | |

OTHER PUBLICATIONS

Christiaan Johannes Burger (2016) Design Procedure of a Compact Aerodynamic Crossover Diffuser for Micro Gas Turbine Application, Presented for Master of Engineering at Stellenbosch University, Mar. 2016.
Startsev, A., et al., "CFD Design and Analysis of a Compact Single-Spool Compressor for a Heavy Transport Helicopter's Powerplant," 29th Congress of the International Council of the Aeronautical Sciences, Sep. 7-12, 2014.

* cited by examiner

*Primary Examiner* — Jacob M Amick
*Assistant Examiner* — Charles J Brauch
(74) *Attorney, Agent, or Firm* — Lorenz & Kopf LLP

(57) ABSTRACT

A deswirl system for a gas turbine engine includes a deswirl shroud, and at least one deswirl vane having a leading end and a trailing end. The deswirl system includes a deswirl hub spaced apart from the deswirl shroud by the at least one deswirl vane. The deswirl hub includes a hub body that extends at a first angle and a hub extension that extends beyond the trailing end of the at least one deswirl vane. The hub extension extends from the hub body at a second angle, and the first angle is different than the second angle.

19 Claims, 11 Drawing Sheets

DESWIRL SYSTEM FOR GAS TURBINE ENGINE

TECHNICAL FIELD

The present disclosure generally relates to gas turbine engines, and more particularly relates to a deswirl system associated with a compressor section of a gas turbine engine.

BACKGROUND

Gas turbine engines may be employed to power various devices. For example, a gas turbine engine may be employed to power a mobile platform, such as an aircraft or rotorcraft. Gas turbine engines may include one or more compressors in a compressor section, which operate to draw air into the gas turbine engine and to raise a pressure of that air. Generally, the compressor section is upstream from a combustor in a direction of fluid flow through the gas turbine engine and an exit of the compressor section controls the flow path of the fluid into the combustor. If the exit of the compressor section is not orientated appropriately, the flow of the fluid may reduce combustor performance.

Accordingly, it is desirable to provide a deswirl system for the compressor section of the gas turbine engine, which directs the fluid flow into the combustor at an angle to improve combustor performance. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a deswirl system for a gas turbine engine. The deswirl system includes a deswirl shroud, and at least one deswirl vane having a leading end and a trailing end. The deswirl system includes a deswirl hub spaced apart from the deswirl shroud by the at least one deswirl vane. The deswirl hub includes a hub body that extends at a first angle and a hub extension that extends beyond the trailing end of the at least one deswirl vane. The hub extension extends from the hub body at a second angle, and the first angle is different than the second angle.

The first angle is less than the second angle. The hub extension extends beyond an end of the deswirl shroud. The hub extension is continuous about a perimeter of the hub body. The hub extension includes a plurality of holes defined about a perimeter of the hub extension. The hub extension has a first extension surface opposite a second extension surface, each of the plurality of holes is defined through the first extension surface and the second extension surface, and the second extension surface includes a scoop defined proximate each of the plurality of holes that extends about the perimeter of the hub extension. The hub extension has a terminal end and includes a curved surface that extends radially from the terminal end. The hub extension includes a plurality of slots defined about a perimeter of the hub extension. Each of the plurality of slots includes a ram scoop, the ram scoop has a first scoop end, and the first scoop end is upstream from an associated one of the plurality of slots. The hub body includes a first hub end opposite a second hub end, the second hub end is downstream from the deswirl shroud and downstream from the trailing end of the at least one deswirl vane so as to be spaced apart from the trailing end, and the hub extension extends from the second hub end. The second angle is based on a distance defined between the second hub end and a hub of a diffuser associated with the gas turbine engine. The second angle is based on a radius defined from a terminal end of the hub extension to an axis of rotation of the gas turbine engine. The hub extension extends for a length, and the length is based on a radius defined from a terminal end of the hub extension to an axis of rotation of the gas turbine engine. The first angle is an obtuse angle or a right angle.

Also provided is a gas turbine engine. The gas turbine engine includes a diffuser, and a combustor downstream from the diffuser in a direction of a working fluid flow through the gas turbine engine. The gas turbine engine includes a canted deswirl system downstream from the diffuser and upstream from the combustor. The canted deswirl system includes a deswirl shroud, at least one deswirl vane and a deswirl hub spaced apart from the deswirl shroud by the at least one deswirl vane. The deswirl hub includes a hub body that extends at a first angle relative to the diffuser, and a hub extension that extends beyond the deswirl shroud. The hub extension extends from the hub body at a second angle, and the second angle is greater than the first angle.

The hub body includes a first hub end opposite a second hub end, the second hub end is downstream from the deswirl shroud, and the hub extension extends from the second hub end. The second angle is based on a distance defined between the second hub end and a centerline of a quench hole associated with the combustor. The second angle is based on a radius defined from a terminal end of the hub extension to an axis of rotation of the gas turbine engine. The second angle is based on a distance defined between a hub of the diffuser and a centerline of a quench hole associated with the combustor. The hub extension extends for a length, and the length is based on a radius defined from the second hub end to an axis of rotation of the gas turbine engine and a second radius defined from a terminal end of the hub extension to the axis of rotation of the gas turbine engine.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
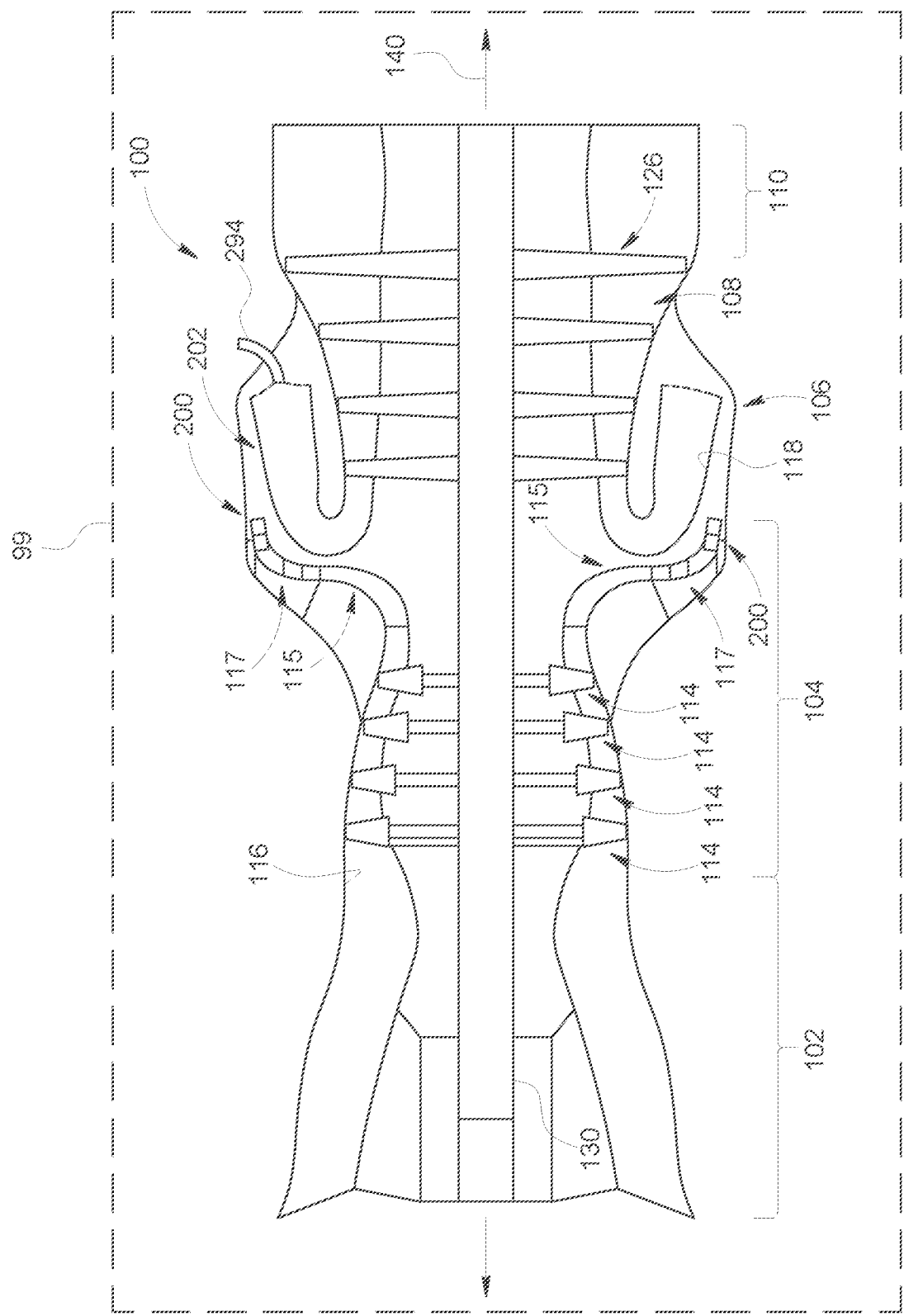
FIG. 1 is a schematic cross-sectional illustration of a gas turbine engine, which includes an exemplary deswirl system in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of engine that would benefit from a deswirl system and the gas turbine engine described herein is merely one exemplary embodiment according to the present disclosure. In addition, while the deswirl system is described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

With reference to FIG. 1, a simplified cross-sectional view of an exemplary gas turbine engine 100 is shown with the remaining portion of the gas turbine engine 100 being substantially axisymmetric about an axis of rotation 140, which also comprises a longitudinal axis for the gas turbine engine 100. As will be discussed herein, the gas turbine engine 100 includes a deswirl system 200 for directing a fluid into a combustor 202. As will be discussed, the deswirl system 200 improves the performance of the combustor 202. In the depicted embodiment, the gas turbine engine 100 is an annular multi-spool turbofan gas turbine jet engine for use with a vehicle, such as a rotorcraft 99, although other arrangements and uses may be provided. For example, in other embodiments, the gas turbine engine 100 may assume the form of a non-propulsive engine, such as an Auxiliary Power Unit (APU) deployed onboard the rotorcraft 99, or an industrial power generator.

In this example, the gas turbine engine 100 includes an intake section 102, a compressor section 104, a combustion section 106, a turbine section 108, and an exhaust section 110. The intake section 102 draws a working fluid, such as air, into the gas turbine engine 100. The air from the intake section 102 is directed into the compressor section 104. In the embodiment of FIG. 1, the compressor section 104 includes one or more axial compressors 114, a centrifugal or radial compressor 115, a diffuser 117 and the deswirl system 200. The compressors 114, 115 are in communication with the intake section 102 via a compressor section duct 116 to receive the working fluid, such as air, from the intake section 102 of the gas turbine engine 100. The compressors 114, 115 pressurize the working fluid in the compressor section duct 116, which passes through the diffuser 117 and enters the deswirl system 200. The deswirl system 200 is in communication with the combustion section 112 to deliver the compressed working fluid to a combustion chamber 118 of the combustor 202 of the combustion section 112. Generally, the compressor 115, the diffuser 117 and the deswirl system 200 comprise a centrifugal compression system associated with the gas turbine engine 100, in which the centrifugal or radial compressor 115 is upstream from the diffuser 117 and the diffuser 117 is upstream from the deswirl system 200 in a direction of the working fluid flow through the gas turbine engine 100.

In the embodiment of FIG. 1, in the combustion section 106, which includes the combustor 202, the high pressure air is mixed with fuel, which is combusted. The high-temperature combustion air is directed into the turbine section 108. In this example, the turbine section 108 includes one or more turbines 126, and in one example, includes four turbines 126 disposed in axial flow series. However, it will be appreciated that the number of turbines, and/or the configurations thereof, may vary. In this embodiment, the high-temperature air from the combustion section 106 expands through and rotates each turbine 126. As the turbines 126 rotate, each drives equipment in the gas turbine engine 100 via at least one concentrically disposed spool or shaft 130. The rotation of the spool or shaft 130 provides power output, which may be utilized in a variety of different manners, depending upon whether the gas turbine engine 100 assumes the form of a turbofan, turboprop, turboshaft, turbojet engine, or an auxiliary power unit, to list but a few examples. The spool or shaft 130 rotates about the axis of rotation 140.

Figure 2:
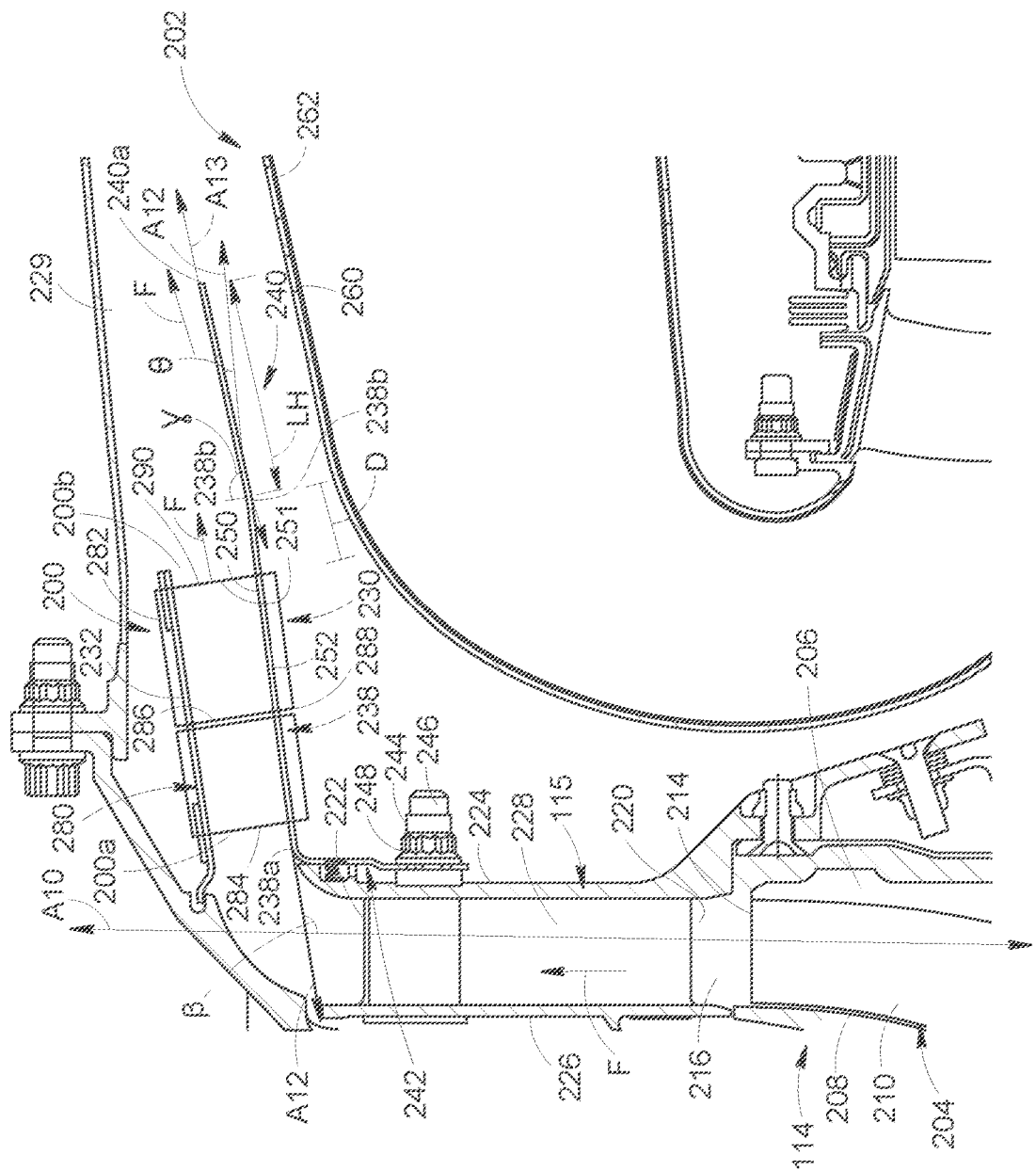
FIG. 2 is a detail cross-sectional view, taken at 2 on FIG. 1, of the deswirl system downstream of a diffuser and upstream from a combustor in a direction of a flow of a working fluid through the gas turbine engine in accordance with the various teachings of the present disclosure.

With reference to FIG. 2, a detail cross-sectional view of a portion of the compressor section 104 and the combustion section 106 is shown. In this example, the compressor 115 is a radial compressor, which includes an impeller 204. The impeller 204 includes an impeller hub 206, an impeller shroud 208, and a plurality of impeller blades 210. Optionally, the impeller 204 may include a plurality of splitter blades. The impeller 204 has an impeller inlet 212 in fluid communication with the compressor 114 (FIG. 1) and an impeller outlet 214 in fluid communication with the diffuser 117. The impeller 204 is upstream from the diffuser 117 in a direction of working fluid flow through the gas turbine engine 100 (FIG. 1). The impeller 204 is generally spaced apart from the diffuser 117 by a vaneless gap 216 that is devoid of vanes or airfoils.

The diffuser 117 is downstream from the impeller 204. The diffuser 117 has a diffuser inlet 220 in fluid communication with the impeller outlet 214, and a diffuser outlet 222 downstream from the diffuser inlet 220. The diffuser outlet 222 is in fluid communication with the deswirl system 200. The diffuser 117 includes a hub 224, a shroud 226 and at least one or a plurality of diffuser vanes 228. The diffuser 117 converts the kinetic energy imparted by the impeller 204 in the received fluid or air into a static pressure rise. In one example, the hub 224 circumscribes the impeller 204 when the diffuser 117 is installed in the gas turbine engine 100 (FIG. 1). The working fluid or compressed air flows from the diffuser 117 to the deswirl system 200.

Figure 3:
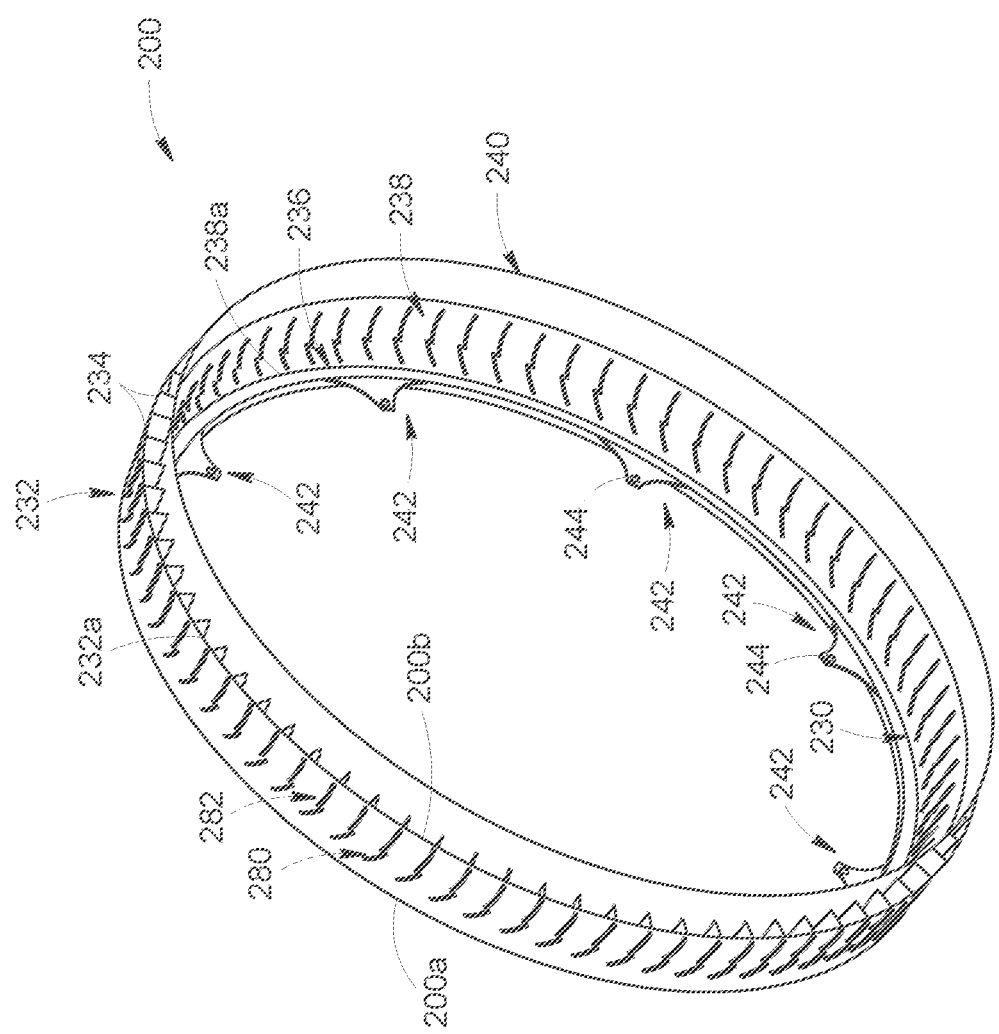
FIG. 3 is a perspective view of the deswirl system of FIG. 1, which includes an exemplary hub extension.

The deswirl system 200 is in fluid communication with the diffuser outlet 222 and the combustor 202. The deswirl system 200 is in fluid communication with the combustor 202 via a combustor plenum 229. The deswirl system 200 is downstream of the diffuser 117 and upstream from the combustor 202. With reference to FIG. 3, the deswirl system 200 includes a deswirl hub 230, a deswirl shroud 232 and a plurality of deswirl vanes 234. In one example, the deswirl hub 230 includes a coupling flange 236, a hub body 238 and a hub extension 240. The deswirl hub 230 is composed of a metal or metal alloy, and may be cast, forged, additively manufactured, etc. The deswirl hub 230 may be integrally formed, monolithic or one-piece, or in other examples, the coupling flange 236 may be formed separately and welded to the hub body 238, for example. The coupling flange 236 extends radially inward from the hub body 238 toward the diffuser 117 and includes one or more coupling tabs 242 for coupling the deswirl system 200 to the diffuser 117. The coupling flange 236 is annular, and extends about the perimeter or circumference of the hub body 238 at a first hub end 238*a* of the hub body 238. The coupling tabs 242 are spaced apart about the perimeter or circumference of the hub body 238. In one example, the coupling flange 236 includes about eight coupling tabs 242, however, it should be understood that the coupling flange 236 may include any number of coupling tabs 242 for coupling the deswirl system 200 to the diffuser 117. In this example, each of the coupling tabs 242 define a coupling bore 244, which is sized to receive a mechanical fastener 246 (FIG. 2), such as a bolt, screw, etc. therethrough. In this example, the coupling tabs 242 taper to the coupling bore 244, however, it should be understood that the coupling tabs 242 may have any desired shape. Generally, with reference back to FIG. 2, the coupling bore 244 is coaxially aligned with an associated bore 248 of the diffuser 117 and the mechanical fastener 246 is inserted through both the coupling bore 244 and the bore 248 of the diffuser 117 to couple the deswirl system 200 to the diffuser 117.

Figure 4:
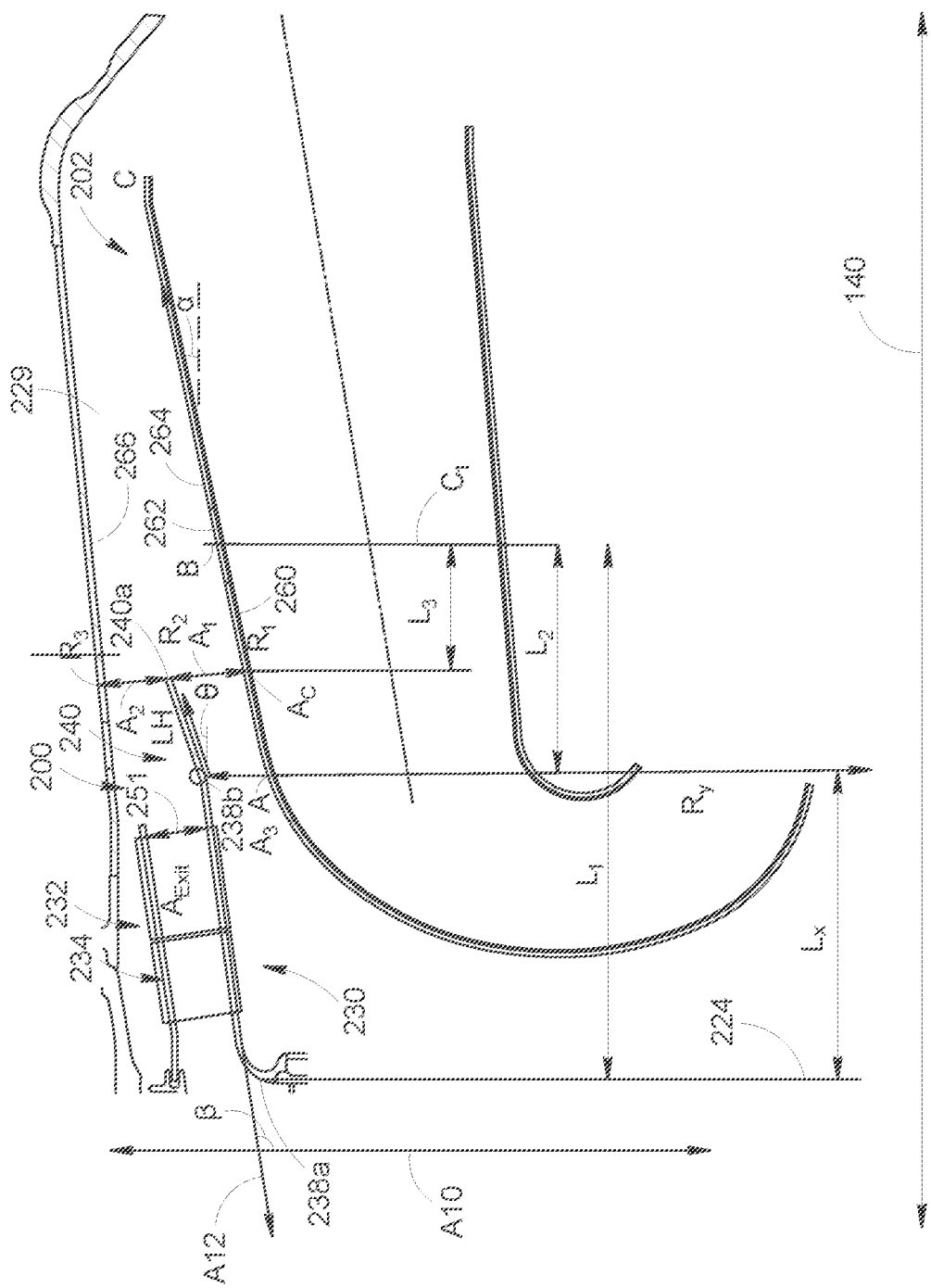
FIG. 4 is a detail cross-sectional view of the deswirl system and a portion of a combustor associated with the gas turbine engine of FIG. 1.

The hub body 238 extends from the first hub end 238*a* to an opposite second hub end 238*b*. In this example, the hub body 238 is canted or angled relative to the diffuser 117. In this regard, the diffuser 117 generally extends along an axis A10, which is about perpendicular to the longitudinal axis L of the gas turbine engine 100 (FIG. 1). The hub body 238 extends along an axis A12, which is transverse or oblique to the axis A10. The axis A12 is transverse or oblique to the axis of rotation 140. In one example, the hub body 238 extends at a first angle or an angle β of about 95 degrees to about 125 degrees relative to the diffuser 117, and in one example, the angle β is about 110 degrees to about 125 degrees. Stated another way, the angle β is defined between the axis A10 and the axis A12, and the angle β is an obtuse angle. The hub body 238 is generally planar, and extends from the first hub end 238*a* to the second hub end 238*b*. As will be discussed, the deswirl vanes 234 are coupled to a first hub surface 250 the hub body 238 between the first hub end 238*a* and the second hub end 238*b*. The first hub surface 250 is opposite a second hub surface 252. The first hub surface 250 faces the deswirl shroud 232, and the second hub surface 252 faces a combustor liner 264 of the combustor 202 (FIG. 4). In one example, the hub body 238 extends for a distance D beyond the deswirl vanes 234. The distance D is about to about 2.0 times a deswirl passage b-width 251, however, the distance D may vary based on the size of the deswirl system 200. The deswirl passage b-width 251 is a distance defined between the deswirl hub 230 and the deswirl shroud 232 in a radial direction proximate a trailing edge of the deswirl vanes 234. In one example, the deswirl passage b-width 251 is about 0.20 inches (in.) to about 0.70 inches (in.).

The hub extension 240 is coupled to or integrally formed with the second hub end 238*b* along the perimeter or circumference of the second hub end 238*b* so as to be spaced apart from the deswirl vanes 234 by the distance D. Generally, the hub extension 240 is a portion of the deswirl hub 230 that extends beyond the deswirl vanes 234 at a second angle relative to the hub body 238. The hub extension 240 also extends beyond the deswirl shroud 232 such that the hub extension 240 is positioned opposite a plenum wall 266 of the combustor plenum 229. In one example, the hub extension 240 extends along an axis A13, which is transverse or oblique to the axis A12. The axis A13 is also transverse or oblique to the axis A10, and transverse or oblique to the axis of rotation 140. In one example, the hub extension 240 extends at a second angle or an angle θ of about 15 degrees to about 25 degrees relative to the hub body 238. The angle θ is defined between the axis A12 and the axis A13, and the angle θ is an acute angle. Stated another way, the hub extension 240 extends at an angle γ relative to the first hub surface 250. In one example, the angle γ is an obtuse angle and is greater than the angle β formed between the diffuser 117 and the deswirl system 200. The angle γ and the angle θ are supplementary angles, and in one example, the angle γ is about 155 degrees to about 165 degrees. By extending at the angle θ or the angle γ, the hub extension 240 provides additional space between the deswirl vanes 234 and one or more quench holes 260, 262 associated with the combustor 202. In one example, a first, major quench hole 262 is downstream of a second quench hole 260, and is a major quench hole for the combustor 202. Stated another way, the first, major quench hole 262 has a diameter that is different and greater than a diameter of the second quench hole 260. By providing additional space between the deswirl vanes 234 and the quench holes 260, 262, the working fluid F may enter the quench holes 260, 262 at an angle and a trajectory that improves a performance of the combustor 202. In addition, by varying the angle θ with respect to the angle β, the trajectory of the working fluid into the quench holes 260, 262 may be varied to improve combustor performance. Generally, the hub extension 240 extends for a length LH from the second hub end 238b to a terminal end 240a of the hub extension 240. In one example, the length LH is about 0.25 to about 1.0 times a length L3, which will be discussed below with regard to FIG. 4. In this example, the hub extension 240 is continuous about the perimeter or circumference of the hub body 238, but in other examples, the hub extension 240 may be discontinuous.

It should be noted that the length LH and the angle θ associated with the hub extension 240 may vary based on a shape or configuration of the combustor 202. In one example, with reference to FIG. 4, a detail view of a portion of the deswirl system 200 and the combustor 202 is shown. Generally, the ratio of a length L2 to the length L3 influences a performance of the combustor 202. The length L2 is defined as a distance between the second hub end 238b and the centerline C1 of the first, major quench hole 262. The length L3 is defined as a distance between the terminal end 240a of the hub extension 240 and the centerline C1 of the first, major quench hole 262. If the ratio of L2 to L3 is less than about 1.5, in certain instances, it may reduce ignition performance of the combustor 202 along with other performance parameters. If the ratio of L2 to L3 is greater than about 2.5 it may result in poor performance of the combustor 202, which results in low life and efficiency of the combustor 202. Thus, generally, the ratio of L2 to L3 is between about 1.5 to about 2.5. Stated another way:

$$\frac{L_2}{L_3} = \mu \tag{1}$$

Wherein $L_2$ is a distance defined between the second hub end 238b and the centerline C1 of the first, major quench hole 262; L3 is a distance defined between the terminal end 240a of the hub extension 240 and the centerline C1 of the first, major quench hole 262; and μ is greater than or equal to about 1.5 and less than or equal to about 2.5.

In addition, a ratio of an area A2 defined between the hub extension 240 and a plenum wall 266 to an exit area $A_{Exit}$ defined at the deswirl vanes 234 between the deswirl hub 230 and the deswirl shroud 232 is to be greater than or equal to about 0.9 and less than or equal to about 1.1. Stated another way:

$$\frac{A_2}{A_{Exit}} = \rho \tag{2}$$

Wherein $A_2$ is an area $A_2$ defined between the hub extension 240 and the plenum wall 266; $A_{Exit}$ is an exit area $A_{Exit}$ defined at a shroud outlet 200b proximate the deswirl vanes 234 between the deswirl hub 230 and the deswirl shroud 232; and p is greater than or equal to about 0.9 and less than or equal to about 1.1. The value of p is based on the Mach number of the working fluid F at the exit of the deswirl system 200. Generally, in instances where the Mach number at the exit of the deswirl system 200 is high, the value p of is greater than about 1.0. When ρ is about 0.9, the angle θ is at a maximum. Generally, the area $A_2$ is defined as:

$$A_2 = \pi(R_3^2 - R_2^2) \tag{3}$$

Wherein $R_2$ is a radius defined from the terminal end 240a of the hub extension 240 to the axis of rotation 140 of the gas turbine engine 100 (FIG. 1); and $R_3$ is a radius defined from a point on the plenum wall 266 opposite the terminal end 240a of the hub extension 240 to the axis of rotation 140 of the gas turbine engine 100 (FIG. 1). Generally, $R_2$ is defined as:

$$R_2 = \sqrt{R_3^2 - \frac{\rho A_{Exit}}{\pi}} \tag{4}$$

Wherein $R_3$ is a radius defined from a point on the plenum wall 266 opposite the terminal end 240a of the hub extension 240 to the axis of rotation 140 of the gas turbine engine 100 (FIG. 1); $A_{Exit}$ is an exit area $A_{Exit}$ defined at a shroud outlet 200b proximate the deswirl vanes 234 between the deswirl hub 230 and the deswirl shroud 232; and ρ is greater than or equal to about 0.9 and less than or equal to about 1.1.

In addition, a ratio of an area $A_1$ defined between the terminal end 240a of the hub extension 240 and a point AC on the combustor liner 264 to an area $A_3$ defined between the second hub end 238b (point O in FIG. 4) and a point A on the combustor liner 264 is to be greater than or equal to about 1.0. The point AC is opposite the terminal end 240a of the hub extension 240 and generally spaced apart from the point A. Stated another way:

$$\frac{A_1}{A_3} = \sigma \tag{5}$$

Wherein $A_1$ is an area defined between the terminal end 240a of the hub extension 240 and a point AC on the combustor liner 264; $A_3$ is an area defined between the second hub end 238b (point O in FIG. 4) and a point A on the combustor liner 264; and σ is greater than or equal to about 1.0. Generally, when σ is equal to about 1.0, the angle θ is at a minimum.

Generally, in order to determine the length LH and the value of the angle θ for a given combustor 202 and deswirl system 200, the following equations (6)-(10) may be used:

$$L_1 = L_x + LH \cos \theta + L_3 \tag{6}$$

Wherein $L_1$ is a distance between the first hub end 238a and a centerline C1 of the first, major quench hole 262; $L_x$ is a distance between the hub 224 and the second hub end 238b (point O on FIG. 4); LH is the length of the hub extension 240; the angle θ is the angle at which the hub extension 240 extends from the hub body 238; and $L_3$ is determined from equation (1).

$$R_2 = R_y + LH \sin \theta \tag{7}$$

Wherein $R_y$ is a radius defined from the axis of rotation 140 of the gas turbine engine 100 (FIG. 1) to the second hub end 238b (point O on FIG. 4). By solving for LH in equation (7), and inserting that into equation (6), the following equation results:

$$L_1 = L_x + \frac{R_2 - R_y}{\sin\theta} \cos\theta + \frac{L_2}{\mu} \tag{8}$$

Solving for θ results in the following equation:

$$\theta = \tan^{-1}\left(\frac{R_2 - R_y}{L_1 - L_x - \frac{L_2}{\mu}}\right) \tag{9}$$

In addition, solving equation (7) for LH results in the following equation:

$$LH = \frac{R_2 - R_y}{\sin\theta} \quad (10)$$

Thus, for any configuration of the combustor 202 and the deswirl system 200, the angle θ and the length LH of the hub extension 240 may be determined to provide for improved combustor performance.

Figure 5:
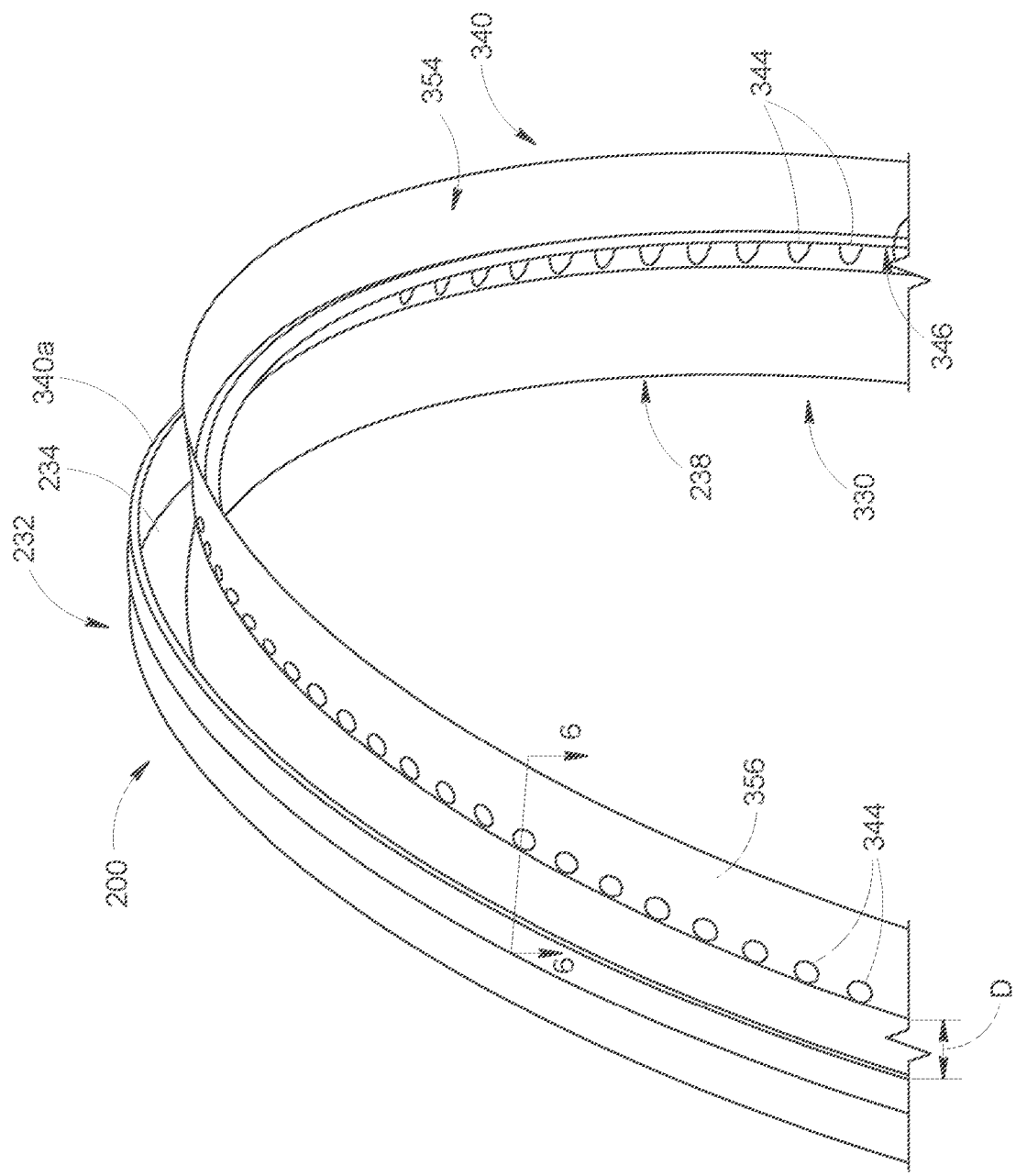
FIG. 5 is a perspective view of a portion of another exemplary hub extension for use with the deswirl system of FIG. 1.

It should be noted that while the hub extension 240 is shown in FIGS. 1-4 as comprising a solid, continuous surface defined about the perimeter or circumference at the second hub end 238b, in other embodiments, the hub extension 240 may be configured differently to improve performance of the combustor 202. For example, with reference to FIGS. 5 and 6, a hub extension 340 is shown for use with the deswirl system 200. As the hub extension 340 includes components that are the same or similar to components of the hub extension 240 discussed with regard to FIGS. 1-4, the same reference numerals will be used to denote the same or similar components. In this example, the deswirl system 200 includes a deswirl hub 330, the deswirl shroud 232 and the deswirl vanes 234. In one example, the deswirl hub 330 includes the coupling flange 236, the hub body 238 and the hub extension 340. It should be noted that the deswirl hub 330 may be coupled to the diffuser 117 using any suitable technique. Generally, as the hub extension 340 extends at the same angle θ and for the length LH discussed with regard to the hub extension 240 and determined using the equations (1)-(10), the angle θ and length LH of the hub extension 340 will not be discussed in detail herein with the understanding that the angle θ and the length LH are the same.

Figure 6:
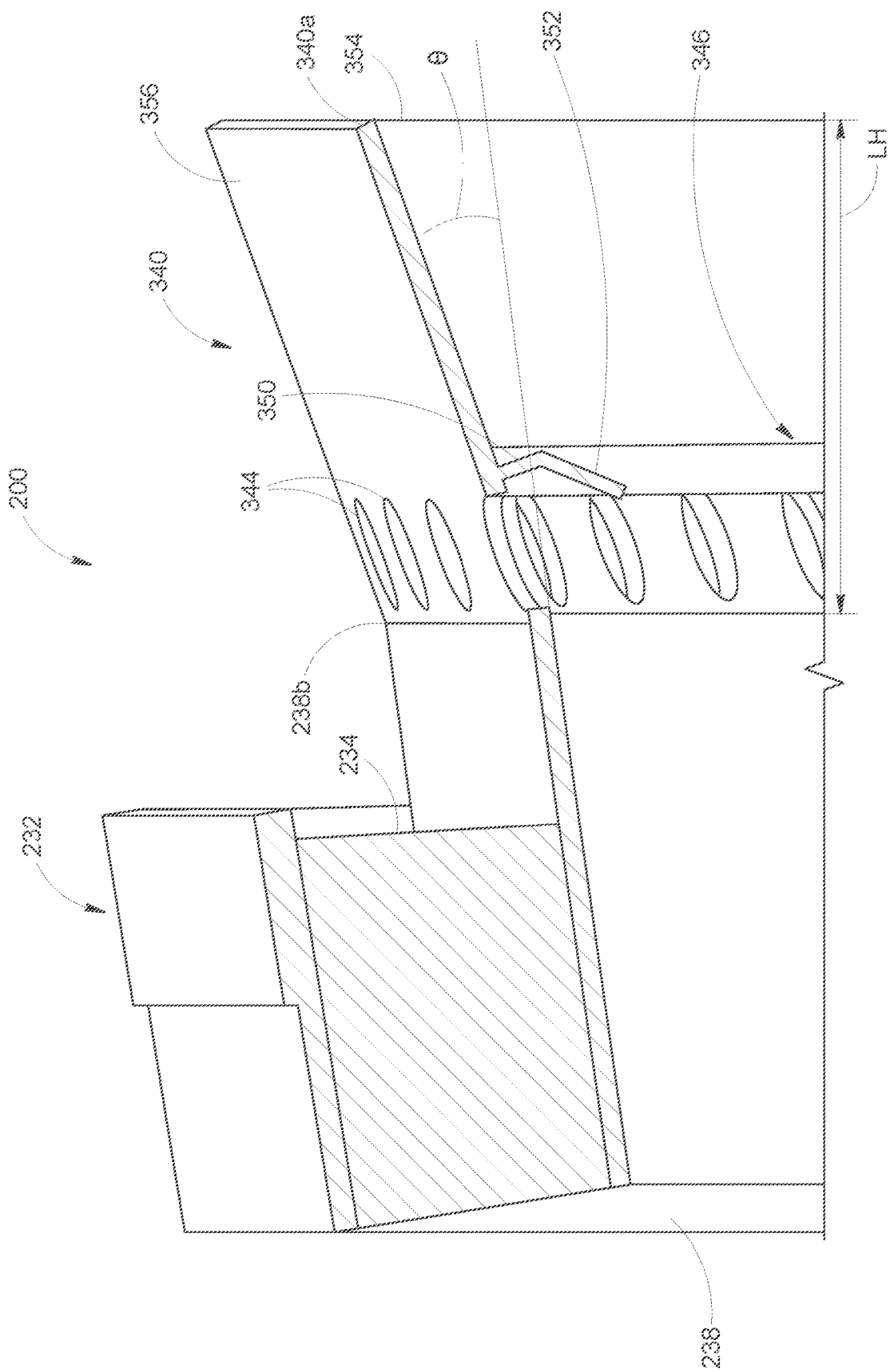
FIG. 6 is a cross-sectional view of the hub extension for use with the deswirl system taken at line 6-6 of FIG. 5.

The hub extension 340 is coupled to or integrally formed with the second hub end 238b along the perimeter or circumference of the second hub end 238b so as to be spaced apart from the deswirl vanes 234 by the distance D. Generally, the hub extension 340 is a portion of the deswirl hub 330 that extends beyond the deswirl vanes 234 at the second angle (angle θ) relative to the hub body 238. The hub extension 340 also extends beyond the deswirl shroud 232 such that the hub extension 340 is positioned opposite the plenum wall 266 of the combustor plenum 229. In this regard, in one example, the hub extension 340 extends at the angle θ of about 15 degrees to about 25 degrees relative to the hub body 238. The hub extension 340 extends for the length LH from the second hub end 238b to a terminal end 340a of the hub extension 340. In this example, the hub extension 340 includes a plurality of openings or holes 344 and a scoop 346. With reference to FIG. 6, the holes 344 are defined through the hub extension 340 proximate or at the second hub end 238b, and are spaced apart about a perimeter or circumference of the hub extension 340. The holes 344 may be formed by machining, or may be formed during the manufacture of the deswirl hub 330. In this example, the holes 344 are circular, however, the holes 344 may have any desired shape, including, but not limited to, racetrack, oval, elliptical, elongated, etc. The hub extension 340 may include any number of the holes 344 about the perimeter or circumference, and further, while the holes 344 are illustrated herein as being substantially evenly spaced apart about the perimeter, the holes 344 may be unevenly spaced if desired. The holes 344 cooperate with the scoop 346 to redirect the working fluid F flow under the deswirl system 200. In addition, the holes 344 and the scoop 346 cooperate to lower the Mach number of the working fluid F at the terminal end 340a of the hub extension 340. The use of the holes 344 and the scoop 346 may also increase pressure recovery in the combustor plenum 229 (FIG. 2) associated with the combustor 202.

The scoop 346 coupled to or integrally formed with the hub extension 340. The scoop 346 is continuous about the perimeter or circumference of the hub extension 340, and extends radially from the hub extension 340 toward the combustor 202. In one example, the scoop 346 includes a first scoop portion 350 and a second scoop portion 352. The first scoop portion 350 is coupled to a second extension surface 354, which is opposite a first extension surface 356. The first extension surface 356 is in contact with the working fluid F that exits the deswirl vanes 234. The first scoop portion 350 is defined proximate the holes 344 so as to be spaced apart from the second hub end 238b by the holes 344. The first scoop portion 350 extends along an axis that is transverse or oblique to the second extension surface 354. The first scoop portion 350 directs the working fluid F that flows through the holes 344 to the second scoop portion 352, and the second scoop portion 352 directs the working fluid F flow under the deswirl system 200. The second scoop portion 352 is coupled to the first scoop portion 350 and extends along an axis that is transverse or oblique to the first scoop portion 350. Generally, the second scoop portion 352 extends at an angle relative to the first scoop portion 350 toward the holes 344 to direct the flow under the deswirl system 200. The angle of the second scoop portion 352 may be used to control the direction of the working fluid F entering the quench holes 260, 262 and enables the working fluid F to be redirected as needed depending on the combustor 202.

Figure 7:
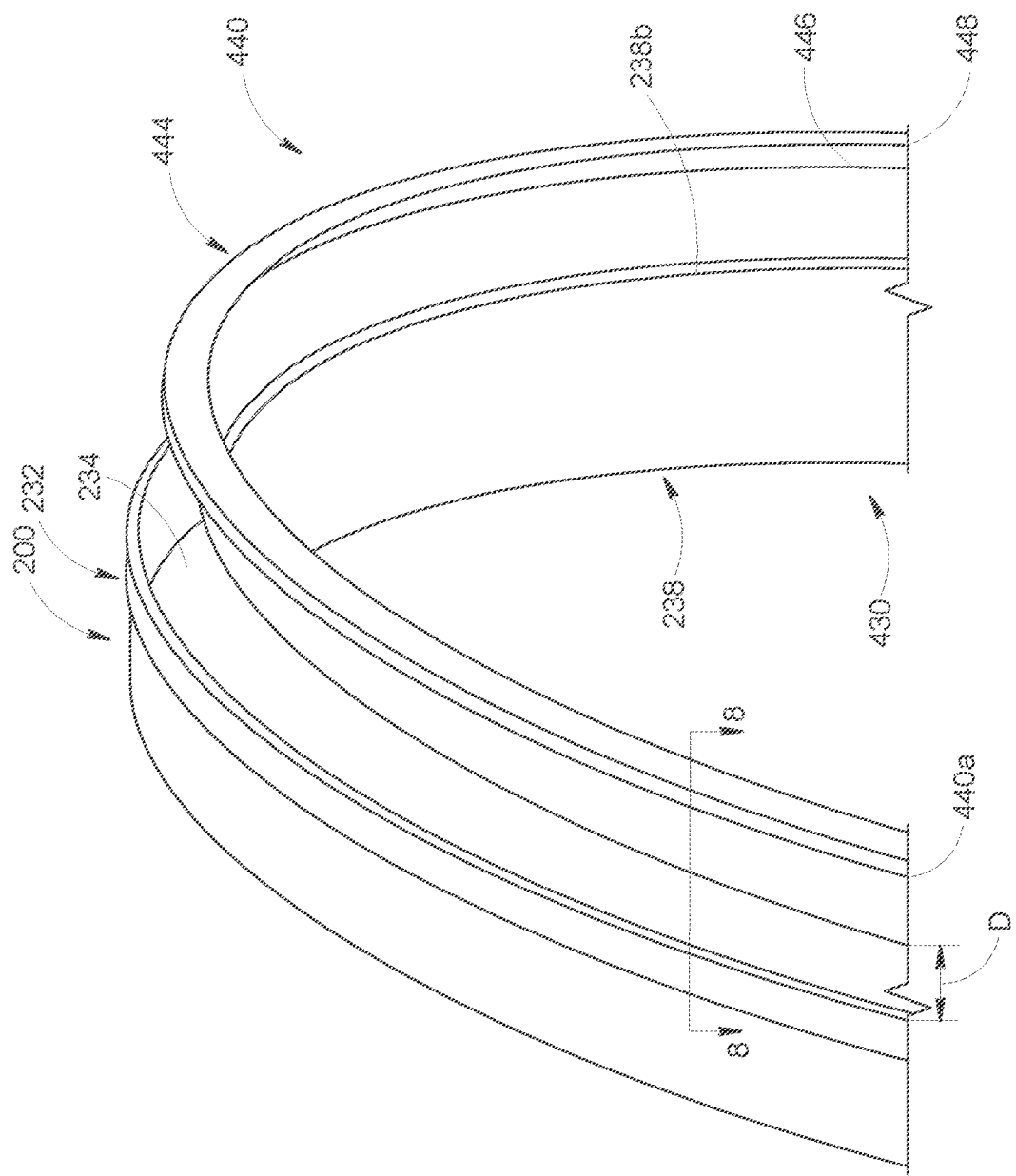
FIG. 7 is a perspective view of a portion of another exemplary hub extension for use with the deswirl system of FIG. 1.

It should be noted that while the hub extension 240 is shown in FIGS. 1-4 as comprising a solid, continuous surface defined about the perimeter or circumference at the second hub end 238b, in other embodiments, the hub extension 240 may be configured differently to improve performance of the combustor 202. For example, with reference to FIGS. 7 and 8, a hub extension 440 is shown for use with the deswirl system 200. As the hub extension 440 includes components that are the same or similar to components of the hub extension 240 discussed with regard to FIGS. 1-4, the same reference numerals will be used to denote the same or similar components. In this example, the deswirl system 200 includes a deswirl hub 430, the deswirl shroud 232 and the deswirl vanes 234. In one example, the deswirl hub 430 includes the coupling flange 236, the hub body 238 and the hub extension 440. It should be noted that the deswirl hub 430 may be coupled to the diffuser 117 using any suitable technique. Generally, as the hub extension 440 extends at the same angle θ and for the length LH discussed with regard to the hub extension 240 and determined using the equations (1)-(10), the angle θ and length LH of the hub extension 440 will not be discussed in detail herein with the understanding that the angle θ and the length LH are the same.

Figure 8:
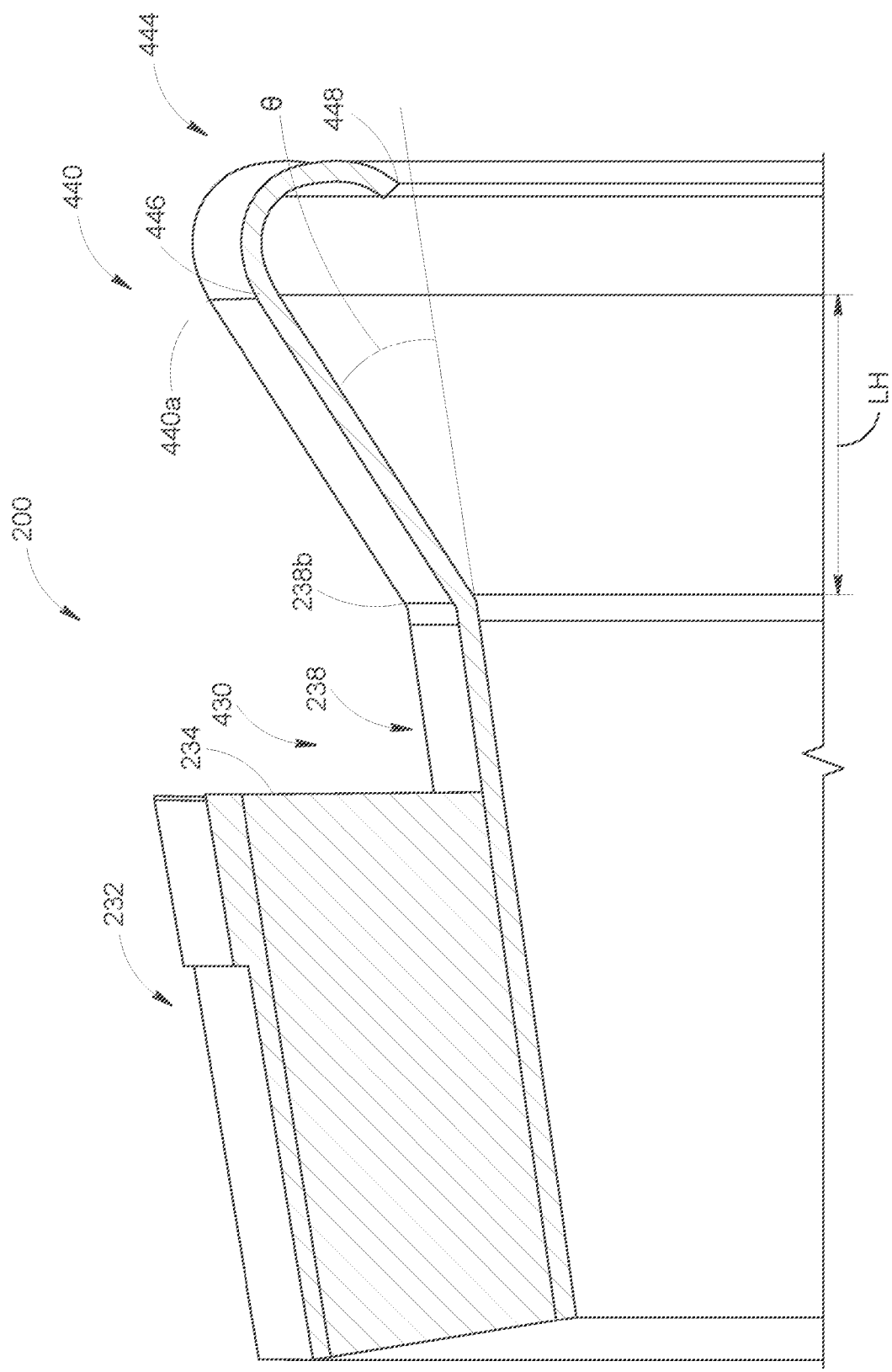
FIG. 8 is a cross-sectional view of the hub extension for use with the deswirl system taken at line 8-8 of FIG. 7.

The hub extension 440 is coupled to or integrally formed with the second hub end 238b along the perimeter or circumference of the second hub end 238b so as to be spaced apart from the deswirl vanes 234 by the distance D. Generally, the hub extension 440 is a portion of the deswirl hub 430 that extends beyond the deswirl vanes 234 at the second angle (angle θ) relative to the hub body 238. The hub extension 440 also extends beyond the deswirl shroud 232 such that the hub extension 440 is positioned opposite the plenum wall 266 of the combustor plenum 229. In this regard, in one example, the hub extension 440 extends at the angle θ of about 15 degrees to about 25 degrees relative to the hub body 238. The hub extension 440 extends for the length LH from the second hub end 238*b* to a terminal end 440*a* of the hub extension 440. In this example, the hub extension 440 includes a curved surface 444 defined at the terminal end 440*a*. With reference to FIG. 8, the curved surface 444 is defined at the terminal end 440*a*, and has a substantially C-shape. The curved surface 444 is continuous about the perimeter or circumference of the hub extension 440. The curved surface 444 may be formed during the manufacture of the deswirl hub 330. The curved surface 444 has a concave curvature, and extends from a first end 446 to a second end 448. The first end 446 is coupled to or integrally formed with the terminal end 440*a* of the hub extension 440, and the curved surface 444 is curved such that the second end 448 terminates under a portion of the curved surface 444. Stated another way, the curved surface 444 extends radially inward at the second end 448. By providing the hub extension 440 with the curved surface 444, the curved surface 444 creates a gentler flow path around the combustor plenum 229 (FIG. 2), which may provide improved pressure recovery. In addition, the curved surface 444 delays flow separation that may occur as the working fluid F flows over the hub extension 440 into the combustor plenum 229 (FIG. 2). In certain instances, the curved surface 444 may also be used as a stiffening mechanism if vibratory excitation is present.

Figure 9:
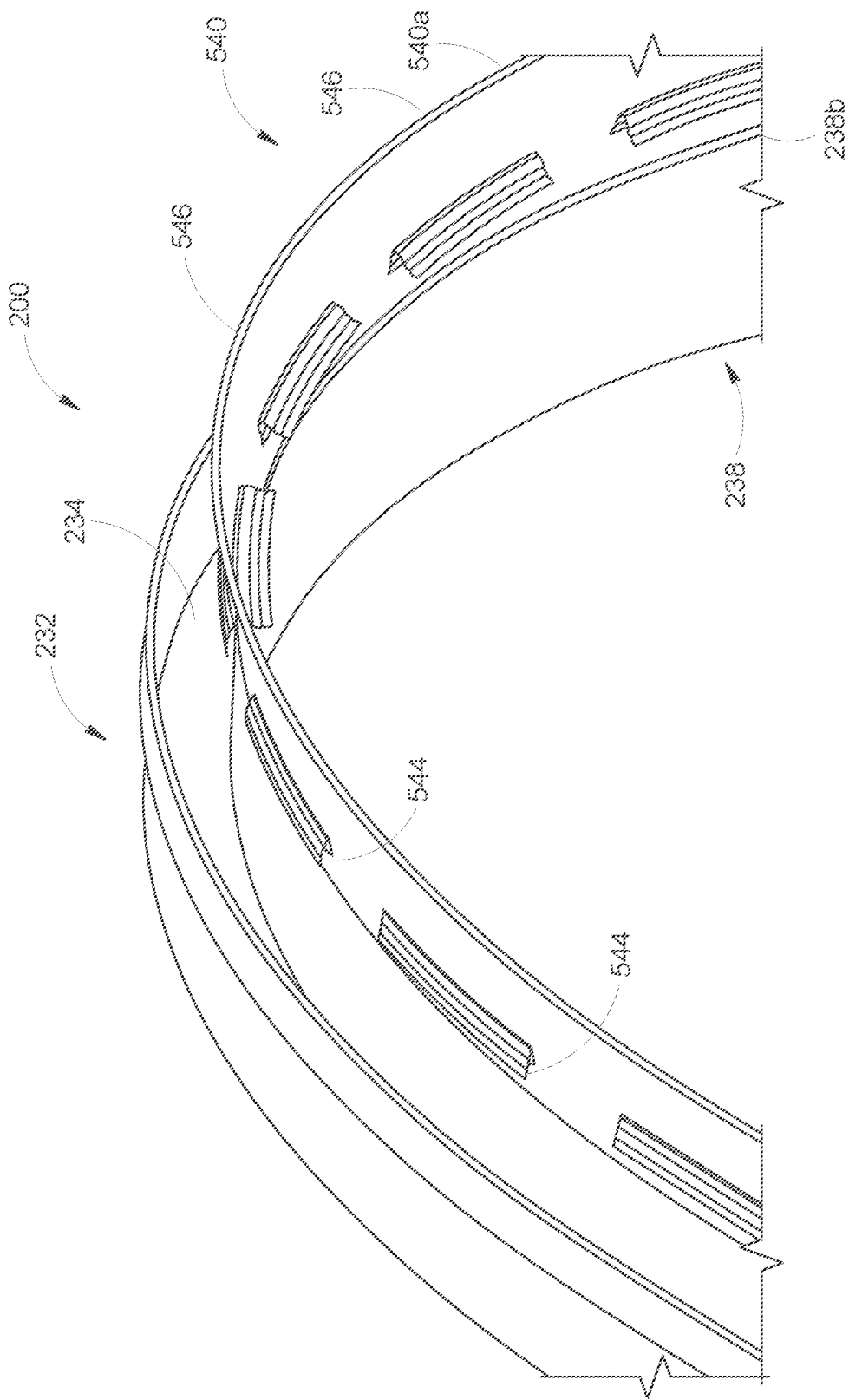
FIG. 9 is a perspective view of a portion of another exemplary hub extension for use with the deswirl system of FIG. 1.

It should be noted that while the hub extension 240 is shown in FIGS. 1-4 as comprising a solid, continuous surface defined about the perimeter or circumference at the second hub end 238*b*, in other embodiments, the hub extension 240 may be configured differently to improve performance of the combustor 202. For example, with reference to FIGS. 9 and 10, a hub extension 540 is shown for use with the deswirl system 200. As the hub extension 540 includes components that are the same or similar to components of the hub extension 240 discussed with regard to FIGS. 1-4, the same reference numerals will be used to denote the same or similar components. In this example, the deswirl system 200 includes a deswirl hub 530, the deswirl shroud 232 and the deswirl vanes 234. In one example, the deswirl hub 530 includes the coupling flange 236, the hub body 238 and the hub extension 540. It should be noted that the deswirl hub 530 may be coupled to the diffuser 117 using any suitable technique. Generally, as the hub extension 540 extends at the same angle θ and for the length LH discussed with regard to the hub extension 240 and determined using the equations (1)-(10), the angle θ and length LH of the hub extension 540 will not be discussed in detail herein with the understanding that the angle θ and the length LH are the same.

Figure 10:
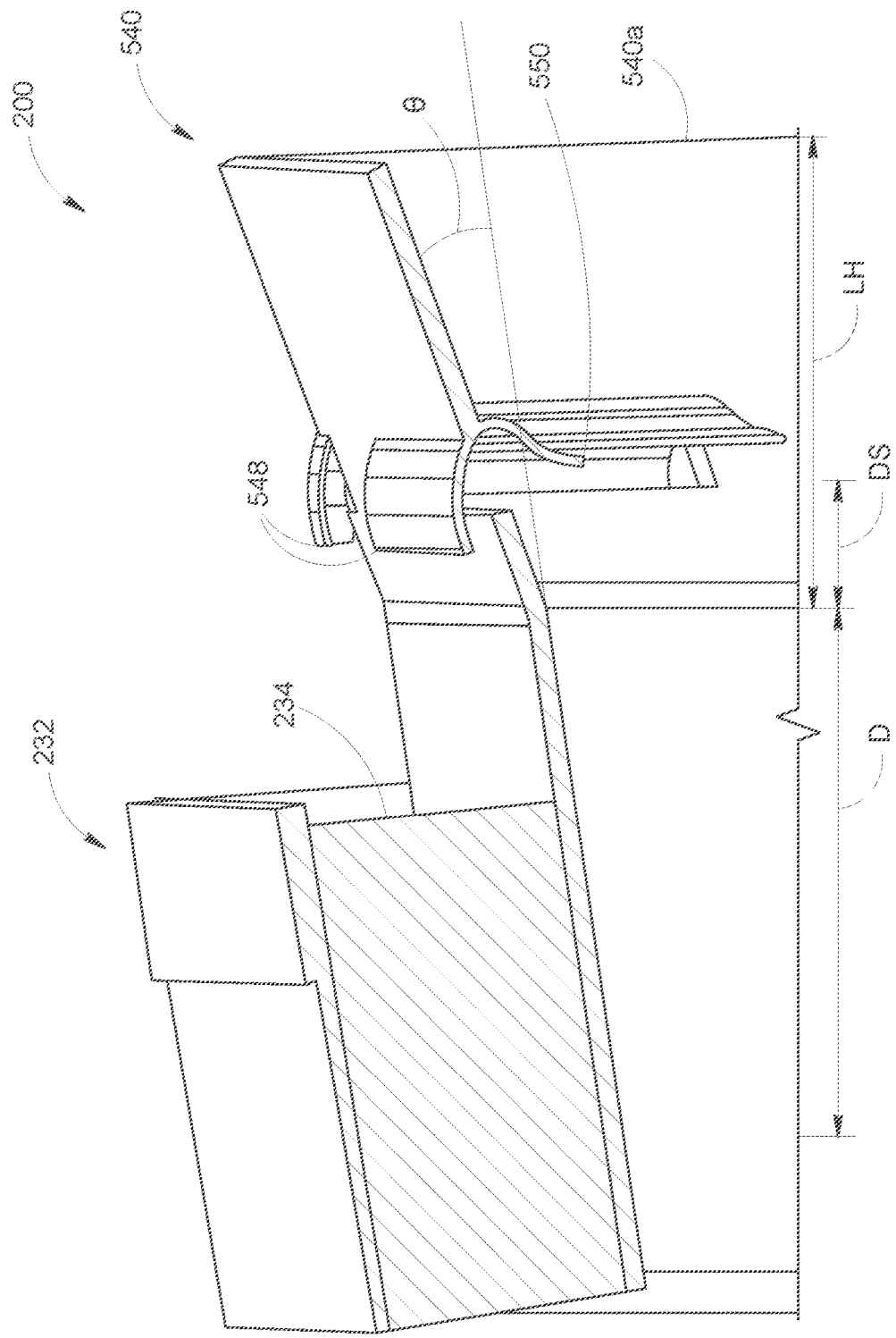
FIG. 10 is a cross-sectional view of the hub extension for use with the deswirl system taken at line 10-10 of FIG. 9.

The hub extension 540 is coupled to or integrally formed with the second hub end 238*b* along the perimeter or circumference of the second hub end 238*b* so as to be spaced apart from the deswirl vanes 234 by the distance D (FIG. 10). Generally, the hub extension 540 is a portion of the deswirl hub 530 that extends beyond the deswirl vanes 234 at the second angle (angle θ) relative to the hub body 238. The hub extension 540 also extends beyond the deswirl shroud 232 such that the hub extension 540 is positioned opposite the plenum wall 266 of the combustor plenum 229. In this regard, in one example, the hub extension 540 extends at the angle θ of about 15 degrees to about 25 degrees relative to the hub body 238. The hub extension 540 extends for the length LH from the second hub end 238*b* to a terminal end 540*a* of the hub extension 540. In this example, the hub extension 540 includes a plurality of slots 544 and a plurality of ram scoops 546. With reference to FIG. 10, the slots 544 are defined through the hub extension 540 proximate the second hub end 238*b*, and in one example, are spaced a distance DS apart from the second hub end 238*b*. The distance DS is about 0.25 to about 1.0 times the distance D. The slots 544 are spaced apart about a perimeter or circumference of the hub extension 340 and are discrete or not continuous about the perimeter or circumference. The spacing of the slots 544 by the distance DS reduces an impact of the slots 544 on compressor performance by reducing back pressure acting on the compressor section 104. The slots 544 may be formed by machining, or may be formed during the manufacture of the deswirl hub 530. In this example, the slots 544 are rectangular, however, the slots 544 may have any desired shape, including, but not limited to, oblong, etc. The hub extension 540 may include any number of the slots 544 about the perimeter or circumference, and further, while the slots 544 are illustrated herein as being substantially evenly spaced apart about the perimeter, the slots 544 may be unevenly spaced if desired. Generally, the slots 544 are defined so as to be aligned with a fuel injector 294 (FIG. 1) associated with the combustor 202. In one example, the hub extension 540 may include about 12 slots 544, each associated with a respective one of 12 fuel injectors 294. The slots 544 cooperate with a respective one of the ram scoops 546 to force some of the working fluid F in the flow path to be diverted under the deswirl system 200 and around the combustor plenum 229 (FIG. 2). In addition, the slots 544 and the ram scoops 546 may also increase pressure recovery in the combustor plenum 229 (FIG. 2) associated with the combustor 202.

Each of the ram scoops 546 is coupled to or integrally formed with a respective one of the slots 544. Generally, each of the slots 544 includes a respective ram scoop 546, such that the ram scoops 546 are discontinuous about the perimeter or circumference of the hub extension 540. Each of the ram scoops 546 is substantially C-shaped, and includes a first ram end 548 and a second ram end 550. Each of the ram scoops 546 curves, in a substantially concave curvature, from the first ram end 548 to the second ram end 550. In one example, the first ram end 548 of each of the ram scoops 546 extends over or overlaps the respective slot 544 such that the first ram end 548 is upstream from the respective slot 544. The second ram end 550 extends radially from the hub extension 540 toward the combustor 202. Each of the ram scoops 546 collects some of the working fluid flow without causing a major disturbance to the main flow field and while minimizing back pressure acting on the compressor section 104. Generally, each of the ram scoops 546 extend from the hub extension 540 to enable about a 180 degree turn of the working fluid flow before entering the quench holes 260, 262. In one example, each of the ram scoops 546 extend from the hub extension 540 about 10% of the deswirl passage b-width 251 (FIG. 4).

Figure 11:
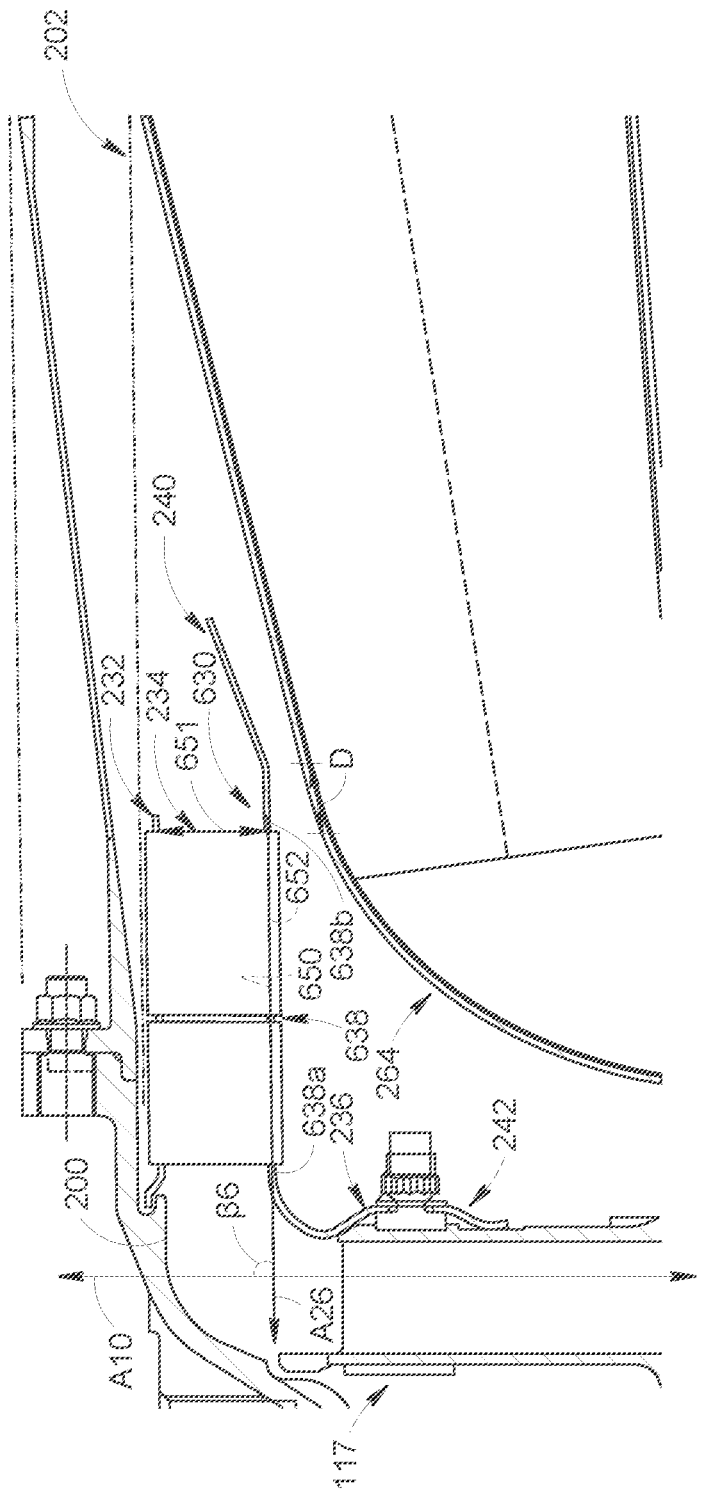
FIG. 11 is a detail cross-sectional view of the deswirl system and the portion of the combustor associated with the gas turbine engine of FIG. 1, in which the deswirl system includes another exemplary hub body coupled to the exemplary hub extension.

It should be noted that while the hub extension 240 is shown in FIGS. 1-4 as comprising a solid, continuous surface defined about the perimeter or circumference at the second hub end 238*b*, in which the hub body 238 extends at the angle β that is an obtuse angle, in other embodiments, the hub body 238 may be configured differently to improve performance of the combustor 202. For example, with reference to FIG. 11, a hub body 638 having the hub extension 240 is shown for use with the deswirl system 200. As the hub body 638 includes components that are the same or similar to components of the hub body 238 discussed with regard to FIGS. 1-4, the same reference numerals will be used to denote the same or similar components. In this example, the deswirl system 200 includes a deswirl hub 630, the deswirl shroud 232 and the deswirl vanes 234. In one example, the deswirl hub 630 includes the coupling flange 236, the hub body 638 and the hub extension 240.

The deswirl hub 630 is composed of a metal or metal alloy, and may be cast, forged, additively manufactured, etc. The deswirl hub 630 may be integrally formed, monolithic or one-piece, or in other examples, the coupling flange 236 may be formed separately and welded to the hub body 638, for example. The coupling flange 236 extends radially inward from the hub body 638 toward the diffuser 117 and includes one or more coupling tabs 242 for coupling the deswirl system 200 to the diffuser 117. The coupling flange 236 is annular, and extends about the perimeter or circumference of the hub body 638 at a first hub end 638a of the hub body 638.

The hub body 638 extends from the first hub end 638a to an opposite second hub end 638b. In this example, the hub body 638 is canted or angled relative to the diffuser 117. In this regard, the diffuser 117 generally extends along the axis A10, which is about perpendicular to the longitudinal axis L of the gas turbine engine 100 (FIG. 1). The hub body 638 extends along an axis A26, which is substantially perpendicular to the axis A10. The axis A26 is substantially parallel to the axis of rotation 140. In this example, the hub body 638 extends at a first angle or an angle β6 of about 90 degrees relative to the diffuser 117. Stated another way, the angle β6 is defined between the axis A10 and the axis A12, and the angle β6 is about a right angle. The hub body 638 is generally planar, and extends from the first hub end 638a to the second hub end 638b. The deswirl vanes 234 are coupled to a first hub surface 650 the hub body 638 between the first hub end 638a and the second hub end 638b. The first hub surface 650 is opposite a second hub surface 652. The first hub surface 650 faces the deswirl shroud 232, and the second hub surface 652 faces the combustor liner 264 of the combustor 202. In one example, the hub body 638 extends for the distance D beyond the deswirl vanes 234. The distance D is about 0.5 to about 2.0 times a deswirl passage b-width 651, however, the distance D may vary based on the size of the deswirl system 200. The deswirl passage b-width 651 is a distance defined between the deswirl hub 630 and the deswirl shroud 232 in a radial direction proximate a trailing edge of the deswirl vanes 234. The hub extension 240 is coupled to or integrally formed with the second hub end 638b along the perimeter or circumference of the second hub end 638b so as to be spaced apart from the deswirl vanes 234 by the distance D. Generally, the hub extension 240 is a portion of the deswirl hub 630 that extends beyond the deswirl vanes 234 at a second angle relative to the hub body 638. In one example, the deswirl passage b-width 651 is about 0.20 inches (in.) to about 0.70 inches (in.).

With reference back to FIG. 3, the deswirl shroud 232 is coupled to the deswirl vanes 234 and is radially outboard of the deswirl hub 230, 630. The deswirl shroud 232 is annular, and circumscribes a portion of the deswirl hub 230, 630. Generally, the deswirl shroud 232 is coupled to the deswirl vanes 234 and circumscribes the portion of the deswirl hub 230, 630 coupled to the deswirl vanes 234. The hub extension 240, 340, 440, 540 extends beyond an end 232a of the deswirl shroud 232 such that the deswirl shroud 232 does not circumscribe the hub extension 240, 340, 440, 540. The deswirl shroud 232 is composed of a metal or metal alloy, and may be cast, forged, machined, additively manufactured, etc. The deswirl vanes 234 are coupled between the deswirl hub 230, 630 and the deswirl shroud 232. In one example, the deswirl vanes 234 are discretely formed of a metal or metal alloy, and are coupled to the hub body 238 and the deswirl shroud 232 via welding, brazing, etc.

In this example, the deswirl vanes 234 includes a plurality of first vanes 280 at an inlet 200a of the deswirl system 200, and a plurality of second vanes 282 between the first vanes 280 and the shroud outlet 200b defined between the hub body 238, 638 and the deswirl shroud 232. Each of the first vanes 280 is associated with a respective one of the second vanes 282, and may be angled relative to the respective one of the second vanes 282. With reference to FIG. 2, each of the first vanes 280 include a first leading end 284 and an opposite first trailing end 286. The first leading end 284 is proximate or at the inlet 200a, and the first trailing end 286 is proximate a second leading end 288 of the respective one of the second vanes 282. Each of the first vanes 280 extends in a spanwise or radial direction from the hub body 238, 638 to the deswirl shroud 232. Each of the second vanes 282 include the second leading end 288 and an opposite second trailing end 290. The second leading end 288 is proximate the first trailing end 286 of the respective one of the first vanes 280, and the second trailing end 290 is proximate the shroud outlet 200b. Each of the second vanes 282 extends in a spanwise or radial direction from the hub body 238, 638 to the deswirl shroud 232.

After the pressurized working fluid F exits the deswirl system 200, the working fluid F enters into the combustor plenum 229 to be received within the combustor 202. In this example, the combustor is a rich-burn, quick-mix, lean-burn (RQL) reverse flow combustor, and includes the quench holes 260, 262 and fuel injectors 294 (FIG. 1), with each fuel injector 294 associated with a sector of the combustor 202. In this example, the combustor 202 has 12 sectors, however, the combustor 202 may have any number of sectors, and thus, any number of fuel injectors 294. In the combustor 202, the working fluid F is mixed with fuel and ignited to create the combustive gases to drive the turbines 126 in the turbine section 108. An ignition source, including, but not limited to an ignitor, may be used to ignite the fuel. The quench holes 260, 262 enable the working fluid F to enter the combustor 202 to mix with the fuel for ignition.

In one example, with the deswirl hub 230, 330, 430, 530, 630 formed with the hub extension 240, 340, 440, 540, the deswirl vanes 234 are coupled to the deswirl hub 230, 330, 430, 530, 630. With the deswirl shroud 232 formed, the deswirl shroud 232 is coupled to the deswirl vanes 234 to form the deswirl system 200. The deswirl system 200 is installed in the gas turbine engine 100 so as to be downstream from the diffuser 117, upstream from the combustor 202 and in fluid communication with the combustor plenum 229.

During operation of the gas turbine engine 100, the compressed working fluid F from the one or more compressors 114, 115 (FIG. 1) exits the impeller outlet 214 and flows into the diffuser 117 at the diffuser inlet 220. The working fluid F flows through the diffuser 117 and exits the diffuser 117 at the diffuser outlet 222. From the diffuser outlet 222, the working fluid F flows into the inlet 200a of the deswirl system 200. The working fluid F flows through the deswirl vanes 234, and at the shroud outlet 200b, the working fluid F is directed by the hub extension 240, 340, 440, 540 to exit the deswirl system 200 radially toward the plenum wall 266 (FIG. 4) of the combustor plenum 229. By directing the working fluid F radially outward, toward the plenum wall 266 of the combustor plenum 229, the direction of the flow of the working fluid F is predetermined to provide improved performance for the combustor 202. In this regard, by providing the hub extension 240, 340, 440, 540 at the angle θ and the length LH, additional space or volume is defined between the deswirl system 200 and the quench holes 260, 262 associated with the combustor 202, which allows the flow of the working fluid F to reverse into the quench holes 260, 262. By providing the working fluid F with the space to reverse before entering the quench holes 260, 262, the performance of the combustor 202 is improved because the cool air entering the quench holes 260, 262 is directed downstream, toward the rear of the combustor 202, and away from a flame front produced by the ignition source. Further, by providing the hub body 238 at the angle β, the deswirl system 200 accommodates the working fluid F at high Mach numbers with reduced pressure loses. In addition, the use of the hub extension 240, 340, 440, 540 reduces back pressure, which improves the diffusion of the working fluid F through the diffuser 117. In addition, the hub extension 240, 340, 440, 540 does not increase a diameter of the gas turbine engine 100.

It should be noted that while the hub body 238, 638 is described as being defined at the angle β and the angle β6, respectively, in other examples, a deswirl hub may have a hub body defined at an acute angle, if desired. In the example of the hub body extending at the acute angle, the hub body may also include one of the hub extensions 240, 340, 440, 540.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A deswirl system for a gas turbine engine, comprising:
a deswirl shroud;
at least one deswirl vane having a leading end and a trailing end; and
a deswirl hub spaced apart from the deswirl shroud by the at least one deswirl vane, the at least one deswirl vane coupled to the deswirl shroud and the deswirl hub such that the deswirl shroud is radially outboard of the deswirl hub, the deswirl hub including a hub body that extends at a first angle and a hub extension that extends beyond the trailing end of the at least one deswirl vane and beyond an end of the deswirl shroud, the hub extension extending from the hub body at a second angle, and the first angle is different than the second angle.

2. The deswirl system of claim 1, wherein the first angle is less than the second angle.

3. The deswirl system of claim 1, wherein the hub extension extends beyond the end of the deswirl shroud so as to be positioned opposite a plenum wall.

4. The deswirl system of claim 1, wherein the hub extension is continuous about a perimeter of the hub body.

5. The deswirl system of claim 1, wherein the hub extension includes a plurality of holes defined about a perimeter of the hub extension.

6. The deswirl system of claim 5, wherein the hub extension has a first extension surface opposite a second extension surface, each of the plurality of holes is defined through the first extension surface and the second extension surface, and the second extension surface includes a scoop defined proximate each of the plurality of holes that extends about the perimeter of the hub extension.

7. The deswirl system of claim 1, wherein the hub extension has a terminal end and includes a curved surface that extends radially from the terminal end.

8. The deswirl system of claim 1, wherein the hub extension includes a plurality of slots defined about a perimeter of the hub extension.

9. The deswirl system of claim 8, wherein each of the plurality of slots includes a ram scoop, the ram scoop has a first scoop end, and the first scoop end is upstream from an associated one of the plurality of slots.

10. The deswirl system of claim 1, wherein the hub body includes a first hub end opposite a second hub end, the second hub end is downstream from the deswirl shroud and downstream from the trailing end of the at least one deswirl vane so as to be spaced apart from the trailing end, and the hub extension extends from the second hub end.

11. The deswirl system of claim 10, wherein the second angle is based on a distance defined between the second hub end and a hub of a diffuser associated with the gas turbine engine.

12. The deswirl system of claim 10, wherein the second angle is based on a radius defined from a terminal end of the hub extension to an axis of rotation of the gas turbine engine.

13. The deswirl system of claim 1, wherein the hub extension extends for a length, and the length is based on a radius defined from a terminal end of the hub extension to an axis of rotation of the gas turbine engine.

14. The deswirl system of claim 1, wherein the first angle is an obtuse angle or a right angle.

15. A gas turbine engine, comprising:
a diffuser;
a combustor downstream from the diffuser in a direction of a working fluid flow through the gas turbine engine; and
a canted deswirl system downstream from the diffuser and upstream from the combustor, the canted deswirl system including a deswirl shroud, at least one deswirl vane and a deswirl hub spaced apart from the deswirl shroud by the at least one deswirl vane, the deswirl hub including a hub body that extends at a first angle relative to the diffuser, the hub body includes a first hub end opposite a second hub end, the second hub end is downstream from the deswirl shroud and includes a hub extension that extends from the second hub end beyond the deswirl shroud, the hub extension extending from the hub body at a second angle, the second angle is greater than the first angle and the second angle is based on a distance defined between the second hub end and a centerline of a quench hole associated with the combustor.

16. The gas turbine engine of claim 15, wherein the second angle is based on a radius defined from a terminal end of the hub extension to an axis of rotation of the gas turbine engine.

17. The gas turbine engine of claim 15, wherein the second angle is based on a distance defined between a hub of the diffuser and the centerline of the quench hole associated with the combustor.

18. The gas turbine engine of claim 15, wherein the hub extension extends for a length, and the length is based on a radius defined from the second hub end to an axis of rotation of the gas turbine engine and a second radius defined from a terminal end of the hub extension to the axis of rotation of the gas turbine engine.

19. The deswirl system of claim 1, wherein the at least one deswirl vane extends in a spanwise direction from the deswirl hub to the deswirl shroud and the deswirl shroud circumscribes a portion of the deswirl hub coupled to the at least one deswirl vane.

\* \* \* \* \*